United States Patent [19]

Toyama et al.

[11] 4,211,965

[45] Jul. 8, 1980

[54] DEVICE FOR CONTROLLING ROTATIONAL SPEED OF ELECTRIC MOTOR

[75] Inventors: Jin-Ichi Toyama, Katsuta; Masaki Kawai, Yokohama, both of Japan

[73] Assignee: Hitachi, Ltd., Japan

[21] Appl. No.: 800,536

[22] Filed: May 25, 1977

[30] Foreign Application Priority Data

Jun. 2, 1976 [JP] Japan .................................. 51-63528

[51] Int. Cl.² ............................................. H02P 7/06
[52] U.S. Cl. .................................... 318/341; 318/139
[58] Field of Search ............................... 318/139, 341

[56] References Cited

U.S. PATENT DOCUMENTS

| | | | |
|---|---|---|---|
| 3,361,921 | 1/1968 | Montross et al. | 318/139 |
| 3,764,870 | 10/1973 | Morton et al. | 318/139 |
| 3,936,707 | 2/1976 | Yoshida et al. | 318/139 |

*Primary Examiner*—J. V. Truhe
*Assistant Examiner*—Eugene S. Indyk
*Attorney, Agent, or Firm*—Craig & Antonelli

[57] ABSTRACT

A device for controlling the rotational speed of an electric motor, provided with a bypass contactor for short-circuiting a chopper, wherein the bypass contactor is turned on when the accelerator is actuated to the full extent and when the duty ratio of the chopper exceeds a predetermined value, so that the shock due to the turn-on of the bypass contactor is eliminated.

8 Claims, 10 Drawing Figures

DEVICE FOR CONTROLLING ROTATIONAL SPEED OF ELECTRIC MOTOR

BACKGROUND OF THE INVENTION

This invention relates to a device for controlling the rotational speed of an electric motor and more particularly to such a device having a chopper circuit equipped with a bypass contactor.

In such a motor speed control device, the bypass contactor is connected in parallel with the chopper circuit. By turning the bypass contactor on in a predetermined manner, the voltage at the battery is directly applied to the electric motor to drive the motor at full speed. This type of control device is widely used in, for example, electric cars. A typical example of such control device is disclosed in U.S. Patent Application Ser. No. 382,804 of W. Heyman et al. entitled "Adjustable speed motor control" filed on July 15, 1964 and issued as U.S. Pat. No. 3,337,786 on Aug. 22, 1967.

In this conventional motor speed control device, the bypass contactor is turned on in a certain constant time after the switch for detecting the fully actuated position or state of the accelerator has been turned on by depressing the accelerator pedal to the full extent. Accordingly, when the driver depresses the accelerator suddenly, the bypass contactor may be turned on even though the duty ratio of the chopper is prevented from increasing due to the current limiting characteristic. Consequently, the duty ratio varies discontinuously so that shocks sometimes occur. Especially in case where an electric car is suddenly started with full load, the car is accelerated very slowly and such a shock is so serious that the goods may be broken.

SUMMARY OF THE INVENTION

The object of this invention is to provide a device for controlling the rotational speed of an electric motor, which is free from shocks caused due to the turn-on of the bypass contactor.

According to this invention, therefore, there is provided a device for controlling the speed of an electric motor, comprising an accelerator detection circuit for detecting the fully actuated position or state of the accelerator and a bypass contactor control circuit for detecting the fact that the duty ratio of the chopper is equal to or larger than a predetermined value and for turning on the bypass contactor when both the circuits deliver outputs.

BRIEF DESCRIPTION OF THE DRAWINGS

FIG. 8 shows the relationship between motor current and motor r.p.m., illustrating the points corresponding to the instants at which the bypass contactor is turned on.

DESCRIPTION OF THE PREFERRED EMBODIMENTS

Figure 1:
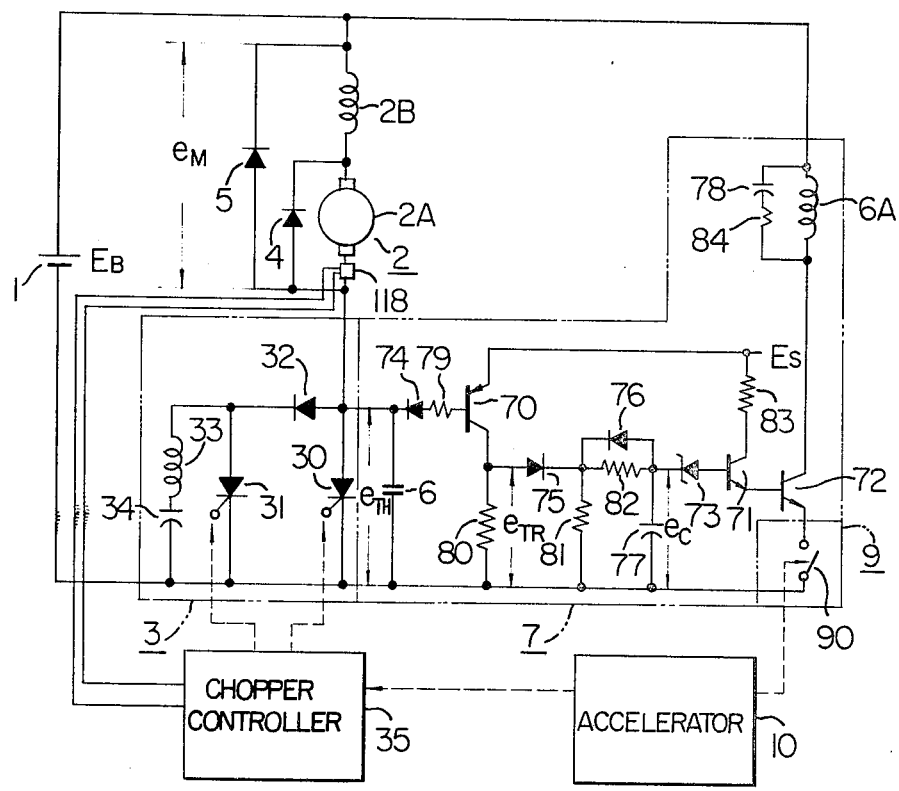
FIG. 1 shows a circuit of a device for controlling the speed of an electric motor, as an embodiment of this invention.

FIG. 1 shows a device for controlling the speed of an electric motor, as a first preferred embodiment of this invention. With a battery 1 is connected the armature 2A and the field coil 2B of an electric motor 2 through a chopper circuit 3. The armature 2A is shunted with a plugging diode 4 while the series connection of the armature 2A and the field coil 2B is shunted with a free wheel diode 5.

The chopper circuit 3, provided to control the speed of the electric motor 2, consists of a main thyristor 30, an auxiliary thyristor 31, a blocking diode 32, a commutating reactor 33 and a commutating capacitor 34. The main thyristor 30 receives the control output of a chopper controller 35 in accordance with the degree of actuation of an accelerator 10. Namely, the speed of the motor 2 is controlled by changing the duty ratio of the chopper circuit 3 which is controlled by the chopper controller 35. A resistor 118 serves to detect the current through the motor 2 and the detected value of the current is fed back to the chopper controller 35 so that the current through the motor 2 is controlled to lie within a certain limited range. A bypass contactor 6 is connected in parallel with the main thyristor 30 of the chopper circuit. The bypass contactor 6 serves to directly apply the voltage of the battery 1 to the motor 2 and is actuated by a bypass contactor control circuit 7 (hereafter referred to briefly as contactor control circuit 7).

The contactor control circuit 7 is actuated to turn on the bypass contactor 6 when the accelerator 10 is fully actuated and when the r.p.m. of the motor 2 exceeds a predetermined value, that is, in this embodiment when the accelerator 10 is actuated to its full extent and when the duty ratio of the main thyristor 30 exceed a predetermined value. The contactor control circuit 7 consists of transistors 70, 71 and 72, a zener diode 73, diodes 74, 75 and 76, capacitors 77 and 78, resistors 79, 80, 81, 82, 83 and 84, and an exciting coil 6A for the bypass contactor 6.

The contactor control circuit 7 is provided with a circuit 9 for detecting the fully actuated position or state of the accelerator 10. The detecting circuit 9 is a full acceleration switch 90 inserted in the emitter circuit of the transistor 72.

The operation of the above constitution is as follows.

Figure 2:
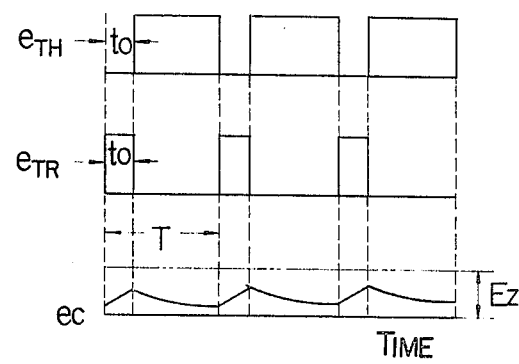
FIGS. 2 and 3 show the waveforms of voltages appearing at several points in the circuit in FIG. 1.
Figure 3:
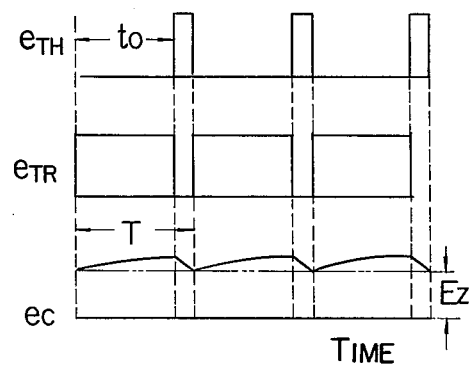

As the accelerator 10 is depressed, the conduction time $t_o$ of the main thyristor 30 increases as shown in FIGS. 2 and 3. Accordingly, the duty ratio $t_o/T$ (when T is the chopping period of the chopper circuit 3) of the chopper circuit 3 increases, the average of the voltage $e_M$ applied to the motor 2 increases and the r.p.m. of the motor 2 increases.

The full acceleration switch 90 is closed when the accelerator 10 is actuated nearly to the full extent. Since the exciting coil 6A and the transistor 72 are connected in series, no current flows through the exciting coil 6A even when the full acceleration switch 90 is closed, until the transistor 72 becomes conductive.

During the time for which the conduction time $t_o$ and the duty ratio $t_o/T$ are both small, the chopper voltage $e_{TH}$ across the main thyristor 30, the voltage $e_{TR}$ across the resistor 80 and the voltage $e_c$ across the capacitor 77 are as shown in FIG. 2. In this case, the voltage $e_c$ across the capacitor 77 is lower than the breakdown voltage $E_Z$ of the zener diode 73 and therefore no current flows into the base of the transistor 71 so that the transistor 71 remains cut off.

As the conduction time $t_o$ and the duty ratio $t_o/T$ increase, the chopper voltage $e_{TH}$, the voltage $e_{TR}$ across the resistor 80 and the voltage $e_c$ across the capacitor 77 change as shown in FIG. 3. The voltage $e_c$ increases to exceeds the breakdown voltage $E_Z$ of the zener diode 73 so that currents flow into the bases of the transistors 71 and 72 to cause the transistor 72 to be conductive. Accordingly, the exciting coil 6A of the bypass contactor 6 is energized and therefore the bypass contactor 6 is closed, the voltage $E_B$ of the battery 1 is applied directly to the motor 2 and the motor 2 rotates at full speed.

Figure 4:
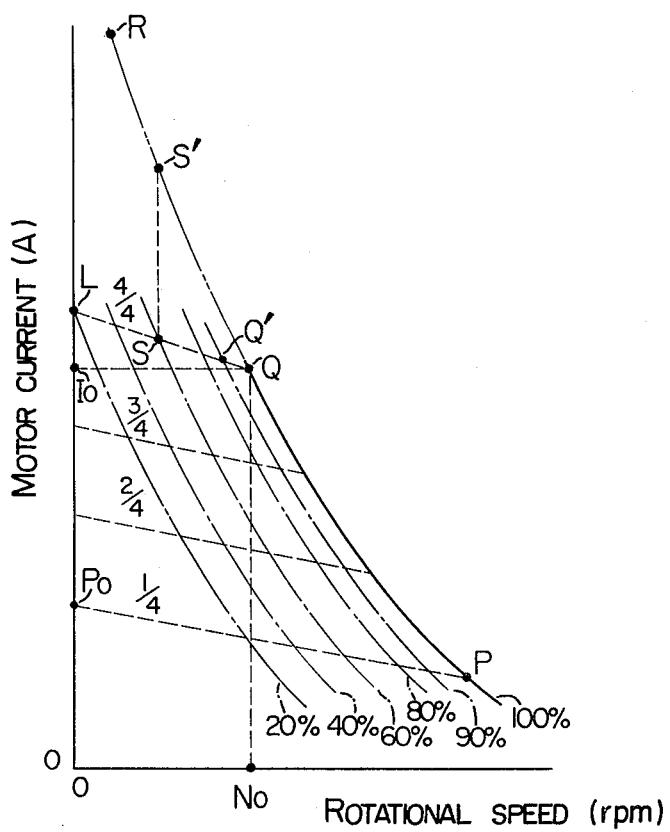
FIG. 4 illustrates the characteristic, i.e. current vs. r.p.m., of an electric motor.

As described above, by turning on the bypass contactor 6 when the duty ratio $t_o/T$ becomes equal to or larger than a predetermined value, e.g. $t_o/T=90\%$, the turn-on of the contactor 6 is represented by the point Q' in FIG. 4.

FIG. 4 shows the characteristic of the motor under consideration, i.e. the relationship between the r.p.m. and motor current with the duty ratio of the chopper circuit as parameter. In FIG. 4, fractions ¼, 2/4, ¾ and 4/4 indicate the current limiting characteristics corresponding to the degree of accelerator actuation. For example, when the accelerator is actuated by ¼ of the full actuation extent, the current limiting effect starts at the point P and thereafter the motor is operated along line P—$P_o$ (when the degree of accelerator actuation is kept constant). Usually, the dc characteristic of the electric motor shifts toward Q (corresponding to the full actuation state of accelerator) when the load becomes larger than a value corresponding to the rated drive on a flat road (corresponding to P) and when the bypass contactor is closed, the motor current shifts from point Q to point R.

If the turn-on of the bypass contactor depends only on the degree of accelerator actuation, the full actuation switch 90 is closed in case of, for example, a sudden start at which the bypass contactor is not closed, and the contactor is closed after a certain time. This means that the bypass contactor is closed while the current limiting circuit for protecting the semiconductor elements from heavy current due to large load is operating, that is, the motor is operating along the dashed line L—Q. As a result, the motor current shifts from point S to point S'.

Figure 5:
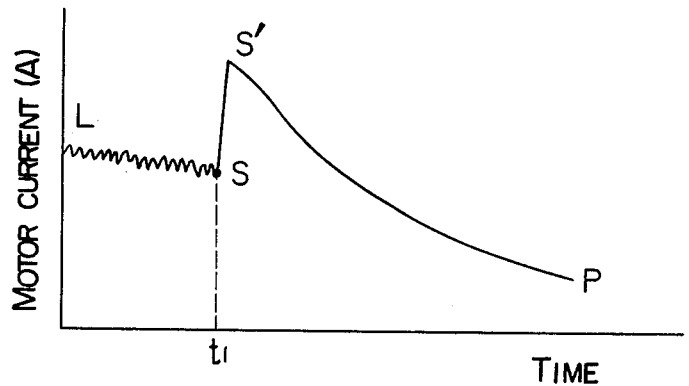
FIG. 5 shows the waveform of the current through an electric motor controlled by a conventional motor speed control device.

The motor current therefore increases rapidly at time $t_1$ as shown in FIG. 5 and the electric car is given a large shock.

Figure 6:
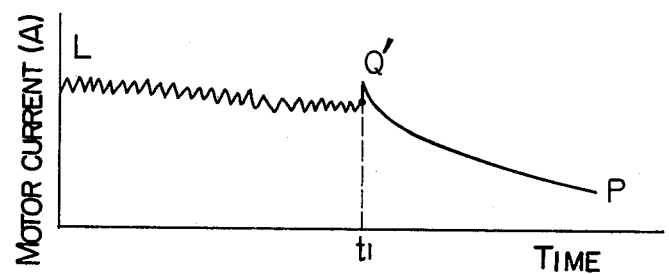
FIG. 6 show the waveform of the current through an electric motor controlled by a motor speed control device according to this invention.

According to this invention, the bypass contactor is closed at point Q' in FIG. 4 so that the motor current changes smoothly as shown in FIG. 6, a heavy shock being prevented from being generated. Especially, in the case where the motor 2 is in the no-load condition, the r.p.m. and the duty ratio can increase rapidly due to swift acceleration so that no shock is caused even if the bypass contactor 6 is closed too early.

On the other hand, if the turn-on of the bypass contactor depends only on the condition that the duty ratio exceeds a predetermined value, the bypass contactor may be closed even in the case where the degree of accelerator actuation has a small value such as ¼ or 2/4. This means that the bypass contactor may be frequently closed in the ordinary drive operation and therefore the useful life of the contactor is adversely affected.

Figure 7:
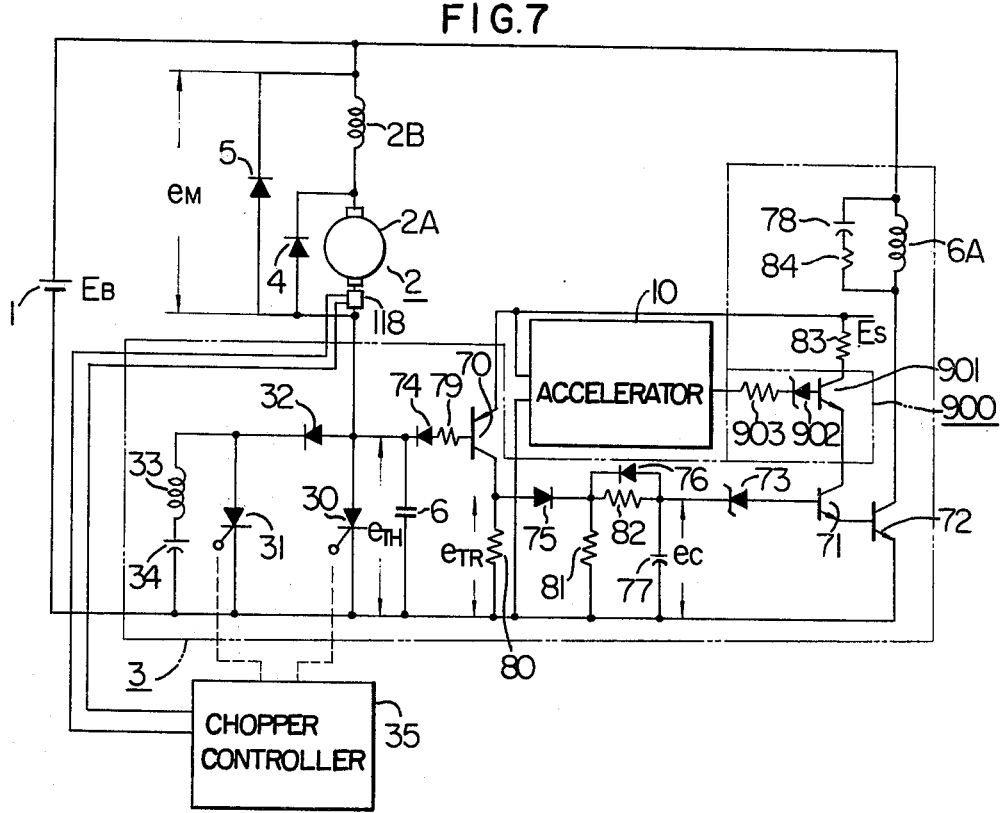
FIG. 7 shows a circuit of a device for controlling the speed of an electric motor, as another embodiment of this invention.

Another embodiment of this invention will now be described with reference to FIG. 7. FIG. 7 shows a circuit of a device for controlling the speed of a motor, similar to that shown in FIG. 1 except for a slight difference. The difference is the omission of the accelerator full actuation switch 90 in FIG. 1 and the compensatory provision of a circuit for detecting the full actuation of the accelerator 10 in the collector circuit in the transistor 71.

The accelerator full actuation detecting circuit 900 serves to detect the output voltage of the accelerator 10, that is, plays the same role as the accelerator full actuation detecting circuit 9. The detecting circuit 900 consists of a transistor 901, a zener diode 902 and a resistor 903 and the output of the accelerator 10 is supplied to the base of the transistor 901 through the resistor 903 and the zener diode 902.

With the above described circuit, when the output voltage of the accelerator 10 exceeds the value determined by the zener diode 902, the transistor 901 is turned conductive so that the source voltage $E_s$ is supplied to the collector of the transistor 71. If under this condition the duty ratio $t_o/T$ of the chopper circuit 3 exceeds a predetermined value, the transistor 72 is also turned on so that current flows through the exciting coil 6A to close the bypass contactor 6. Every part which appeared in FIG. 1 and now appears also in FIG. 7, is indicated by the same reference numeral as in FIG. 1 and the description thereof is omitted.

The same effect can also be enjoyed even if the accelerator full actuation detecting circuit 900 uses a thyristor instead of the transistor 901.

According to this invention, as a means for detecting the condition that the duty ratio of the chopper exceeds a predetermined value, there is provided a method according to which the bypass contactor is closed by detecting the condition that the r.p.m. of the motor exceeds a predetermined value or the motor current decreases below a predetermined value.

Figure 8:
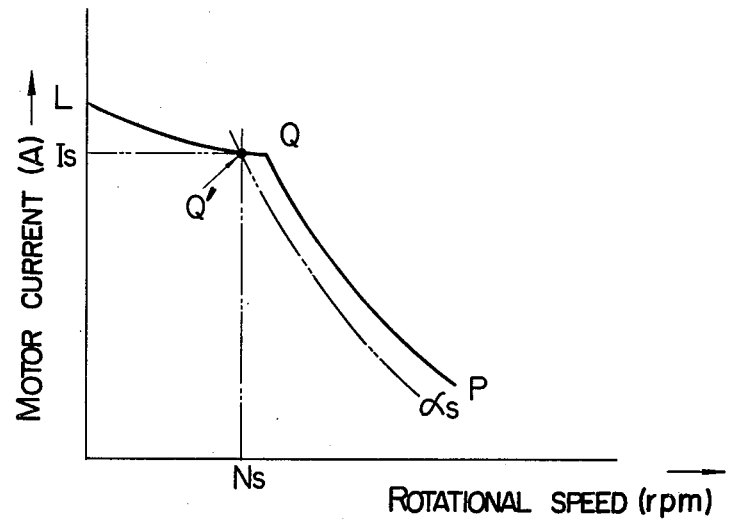

In FIG. 8, the r.p.m. of the motor and the motor current are plotted respectively along the abscissa and the ordinate axes of a rectangular coordinate system. The curve PQL represents the r.p.m. vs. current characteristic when the accelerator is actuated to the full or nearly full extent. The curve labeled $\alpha_s$ denotes the relationship between the r.p.m. and the motor current in the case of the duty ratio being equal to a constant value $\alpha_s$ (i.e. 85–95%) near the maximum. In practice, the value $\alpha_s$ should be chosen to be maximum at which the turn-on and turn-off of the chopper becomes out of control, i.e. slightly less than 95–97%. The point of intersection of the curves $\alpha_s$ and PQL is indicated at point Q'. In the case where the bypass contactor is closed when the duty ratio $\alpha_s$ and when the accelerator is actuated to the full or nearly full extent, the turn-on of the bypass contactor corresponds to the point Q' in FIG. 8. The motor current and the r.p.m. at the operating point Q' is defined as $I_s$ and $N_s$, respectively. Then, for motor speed control, the condition that the r.p.m. of the motor exceeds $N_s$ or that the motor current becomes less than $I_s$ can be detected instead of the condition that the duty ratio exceeds $\alpha_s$.

Figure 9:
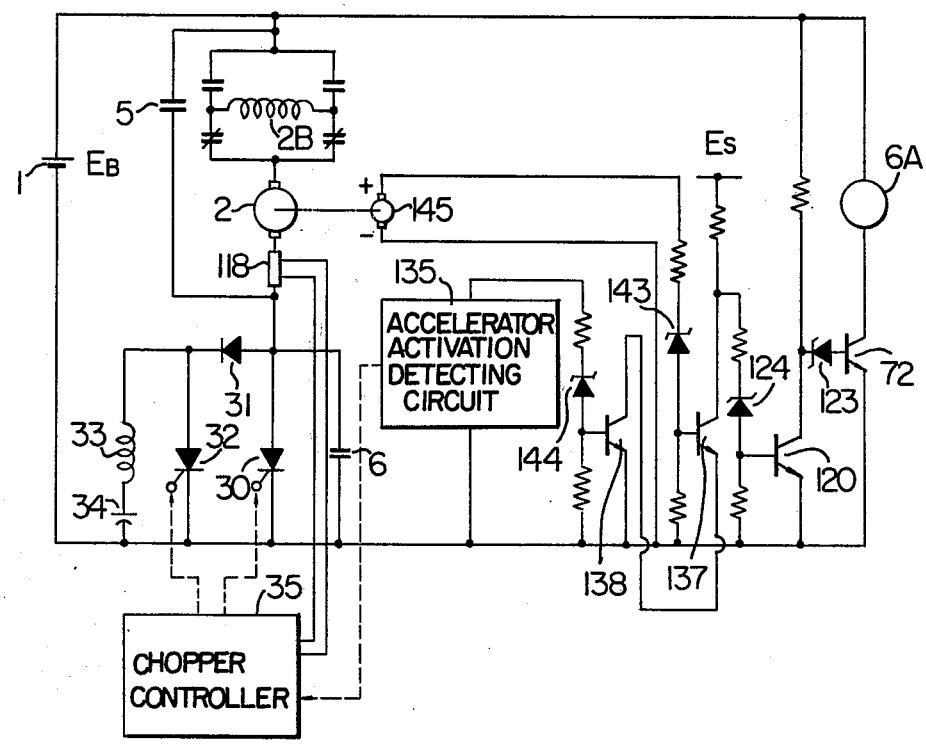
FIGS. 9 and 10 show circuits of devices for controlling the speed of an electric motor, as another embodiments of this invention.

FIG. 9 shows another embodiment of this invention wherein the bypass contactor is closed when the accelerator is actuated to the full or nearly full extent and when the r.p.m. of the motor exceeds a predetermined value. In FIG. 9, a circuit 135 for detecting the degree of accelerator actuation delivers an output voltage increasing with the degree of depression of the accelerator. When the accelerator is actuated to the full or nearly full extent, the output voltage of the circuit 135 exceeds the breakdown voltage of the zener diode 144 so that the transistor 138 is turned on. In order to detect the rotational speed of the motor, a tachometer generator 145 coupled directly to the rotor of the motor is provided. In this embodiment, the tachometer generator is used to detect the r.p.m., but it may be replaced by other detectors such as, for example, digital speed detectors using pulse signals. As the r.p.m. of the motor increases, the output voltage of the tachometer generator 145 increases. When the output voltage exceed a predetermined value, i.e. the breakdown voltage of the zener diode 143, and when the transistor 138 is conductive, the transistor 137 is turned on. Accordingly, the potential at the collector of the transistor 137 falls down so that the current to the base of the transistor 120 is blocked by the zener diode 124 to change over the transistor 120 from its conducting to cut-off state. As a result, a current flows into the base of the transistor 72 through the zener diode 123 so that the transistor 72 is turned on, that a current flows through the exciting coil 6A of the bypass contactor 6 and that the bypass contactor 6 is closed. The above mentioned predetermined value of the r.p.m. is chosen to be equal to $N_s$ in FIG. 8.

Figure 10:
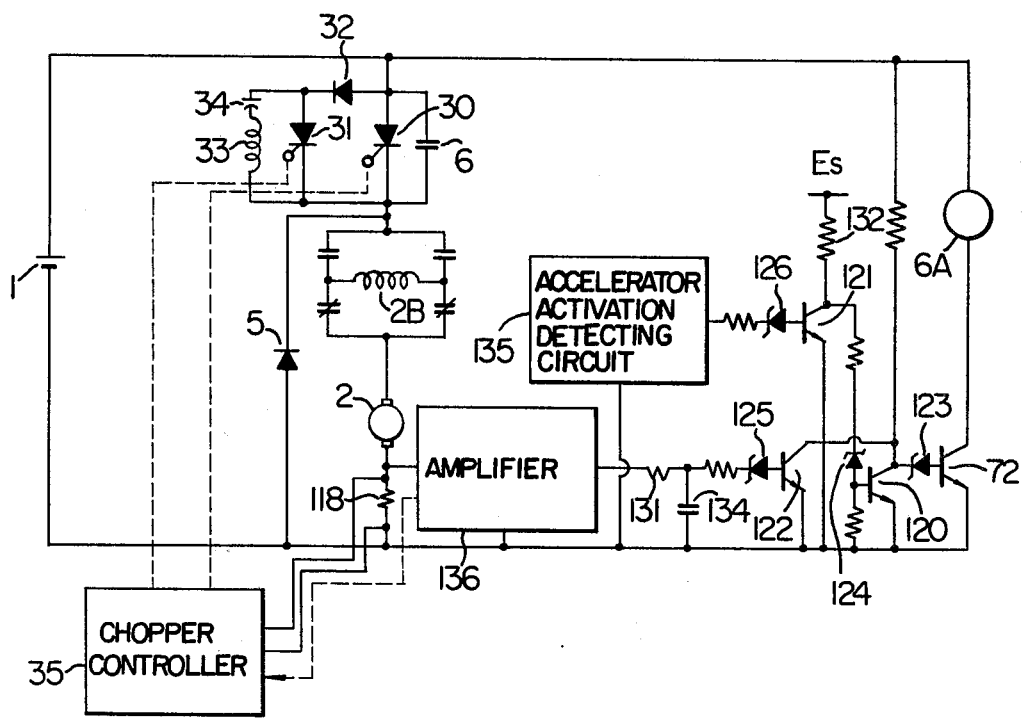

FIG. 10 shows another embodiment of this invention wherein the bypass contactor is closed when the accelerator is actuated to the full and nearly full extent and when the motor current becomes less than a predetermined value. In FIG. 10, a resistor 118 serves to detect the current through the motor and the voltage across the resistor 118 is amplified by an amplifier 136 and the ripple component in the output of the amplifier 136 is eliminated by a circuit consisting of a resistor 131 and a capacitor 134. When the motor current is larger than the predetermined value, the output voltage of the ripple eliminating circuit is higher than the breakdown voltage of a zener diode 125. Accordingly, a current flows into the base of the transistor 122 to turn on the transistor 122. As a result, the potential at the collector of the transistor 122 falls down so that no current flows into the base of the transistor 72. Consequently, the transistor 72 remains cut off and no current flows through the exciting coil 6A of the bypass contactor 6.

When the motor current becomes less than the predetermined value $I_s$, the output voltage of the ripple eliminating circuit, i.e. smoothing circuit, falls below the breakdown voltage of the zener diode 125. As a result, no current flows into the base of the transistor 122 so that the transistor 122 is cut off. If under this condition the output voltage of the accelerator actuation detecting circuit 135 exceeds the breakdown voltage of the zener diode 126 while the accelerator is actuated to the full or nearly full extent, then a current flows into the base of the transistor 121 to turn on the transistor 121. Therefore, the potential at the collector of the transistor 121 falls down and when the potential becomes lower than the breakdown voltage of the zener diode 124, no current flows into the base of the transistor 120 so that the transistor is cut off.

Namely, when the motor current is less than the predetermined value while the accelerator is actuated to the full or neary full extent, both the transistors 120 and 122 are cut off simultaneously. As a result, a current flows into the base of the transistor 72 through a zener diode 123 to turn on the transistor 72 so that the exciting coil 6A is energized to close the contactor 6. Therefore, the shock due to the turn-on of the bypass contactor can be eliminated.

We claim:

1. A device for controlling the speed of an electric motor, comprising a chopper connected between a power source and an electric motor; an accelerator; means for detecting the current through said motor; a controller for controlling the duty ratio of said chopper in accordance with the degree of actuation of said accelerator and said current through said motor and for controlling said current through said motor within a restricted range; a bypass contacor for connecting said motor directly with said power source by short-circuiting said chopper; and a bypass contactor control means for opening and closing said bypass contactor so that the contactor will be open whenever the duty ratio of the chopper is below a predetermined maximum value, wherein said bypass contactor control means includes therein a first means for detecting full actuation of said accelerator and a second means for continuously monitoring the duty cycle of the chopper for detecting every time the duty ratio of said chopper equals or exceeds a predetermined maximum value continuously throughout the operation of the motor by detecting every time when the value of the motor current reaches a predetermined value corresponding to the predetermined duty ratio so that said bypass contactor will be closed when said accelerator is actuated to the full extent and when said duty ratio approximately equals said predetermined maximum value, and said bypass contactor will be open whenever said duty ratio of the chopper is below the predetermined maximum value.

2. A device as claimed in claim 1, wherein the second means includes a sensing resistor coupled to the motor to sense the motor current.

3. A device as claimed in claim 1, wherein the second means detects when the motor current reaches a predetermined minimum value corresponding to the predetermined maximum value of the chopper duty ratio.

4. A device as claimed in claim 2, wherein the bypass contactor control means includes an exciting coil for closing the bypass contactor when it is activated, and the second means further comprises:

a zener diode coupled to the sensing resistor, said zener diode having a breakdown voltage corresponding to a predetermined value of motor current so that said zener diode will be non-conductive whenever the motor current is below said predetermined value throughout the operation of the motor;

a first transistor coupled to the zener diode to conduct when the zener dioded conducts; and a second transistor coupled between the exciting coil and the first transistor and the first means for detecting the full actuation of said accelerator so that said second transistor will conduct to activate the exciting coil to close the bypass contactor when the first means indicates full actuation of the accelerator and the first transistor is not conducting whereby the bypass contactor will only be closed when the motor current is below the predetermined value necessary for the zener diode to conduct.

5. A device for controlling the speed of an electric motor, comprising a chopper connected between a power source and an electric motor; an accelerator; means for detecting the current through said motor; a controller for controlling the duty ratio of said chopper in accordance with the degree of actuation of said accelerator and said current through said motor and for controlling said current through said motor within a restricted range; a bypass contactor for connecting said motor directly with said power source by short-circuiting said chopper; and a bypass contactor control means for opening and closing said bypass contactor, wherein said bypass contactor control means includes therein a first means for detecting the full actuation of said accelerator and a second means for detecting the approximate arrival of the duty ratio of said chopper at a predetermined maximum value by measuring means coupled directly to the motor rotor for detecting a predetermined r.p.m. of the motor corresponding to the predetermined duty ratio and said bypass contactor control means is so constructed that said bypass contactor may be closed when said accelerator is actuated to the full extent and when said duty ratio approximately equals said predetermined maximum value.

6. A device as in claim 5, wherein the measuring means coupled to the rotor is a tachometer.

7. A device as in claim 5, wherein the measuring means coupled to the rotor is a digital speed detector.

8. A device as claimed in claim 5, wherein the bypass contactor control means includes an exciting coil for closing the bypass contactor when it is activated, and the second means further comprises:

- a zener diode coupled to the measuring means, said zener diode having a predetermined breakdown voltage corresponding to a predetermined maximum value of motor r.p.m. which, in turn, corresponds to the predetermined chopper duty ratio; and
- a transistor coupled between the exciting coil and the zener diode and the first means to detect full actuation of the accelerator so that said transistor will conduct to activate the exciting coil to close the bypass contactor when the first means indicates full actuation of the accelerator and when the zener diode conducts.

* * * * *